US012649526B2

(12) United States Patent
Kimpara

(10) Patent No.: US 12,649,526 B2
(45) Date of Patent: Jun. 9, 2026

(54) VEHICLE

(71) Applicant: TOYOTA JIDOSHA KABUSHIKI KAISHA, Toyota (JP)

(72) Inventor: Hiroshi Kimpara, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 19/229,368

(22) Filed: Jun. 5, 2025

(65) Prior Publication Data

US 2026/0062066 A1 Mar. 5, 2026

(30) Foreign Application Priority Data

Sep. 2, 2024 (JP) ................................. 2024-150491

(51) Int. Cl.
B60L 50/50 (2019.01)
B62D 21/15 (2006.01)
B62D 31/00 (2006.01)
(52) U.S. Cl.
CPC ............ B62D 31/006 (2013.01); B60L 50/50 (2019.02); B62D 21/15 (2013.01)
(58) Field of Classification Search
CPC .......... B60L 50/00; B60L 50/10; B60L 50/40; B60L 50/50; B62D 21/00; B62D 21/15; B62D 21/152; B62D 21/17; B62D 21/18; B62D 31/00; B62D 31/003; B62D 31/006; B62D 31/025; B62D 31/04; B62D 33/00; B62D 33/02; B62D 33/0207;

(Continued)

(56) References Cited

U.S. PATENT DOCUMENTS 4,323,133 A * 4/1982 Williams ............... A61G 5/125
280/42
5,480,180 A * 1/1996 Fuller .................. B62D 33/033
280/491.1

(Continued)

FOREIGN PATENT DOCUMENTS

CN 111183088 A * 5/2020 ........... B62D 21/152
CN 116890942 A * 10/2023 ............. B62D 33/02

(Continued)

OTHER PUBLICATIONS

"OX Proposes to Offer Clean Mobility to Everyone, Everywhere", : https://insideevs.com/features/494284/ox-clean-mobility-everywhere-everyone/, Mar. 15, 2021.

*Primary Examiner* — Jason D Shanske
*Assistant Examiner* — Daniel M. Keck
(74) *Attorney, Agent, or Firm* — SoraIP, Inc.

(57) ABSTRACT

A vehicle according to the present disclosure is a vehicle body in which at least a power portion on which a power source of a vehicle body is mounted and a front-rear portion to which at least one of a front wheel and a rear wheel is attached are connected via a link mechanism. The vehicle reversibly changes shape to a traveling form in which the power portion and the front-rear portion can travel while maintaining a flat state by sliding the fastening portion along the guide hole, and a transportation form in which the front-rear portion can be transported while maintaining a state in which the front-rear portion is bent toward the power portion with a fold line between the front-rear portion and the power portion.

2 Claims, 6 Drawing Sheets

(58) Field of Classification Search
CPC .......................... B62D 33/0222; B62D 33/023; B62D 33/027; B62D 33/033; B62D 33/037
USPC ....................................................... 180/208
See application file for complete search history.

(56) References Cited

U.S. PATENT DOCUMENTS

| | | | | |
|---|---|---|---|---|
| 7,097,407 B2 * | 8/2006 | Kurohori | ................. | B62H 3/00 |
| | | | | 414/556 |
| 9,415,813 B2 * | 8/2016 | Ahn | ....................... | B62D 21/14 |
| 11,932,302 B1 * | 3/2024 | Porchay | ................. | B62K 21/12 |
| 11,993,448 B2 * | 5/2024 | Nam | ...................... | B65D 11/10 |
| 2014/0131404 A1 * | 5/2014 | Espig | ..................... | B60R 9/042 |
| | | | | 224/310 |
| 2016/0287459 A1 * | 10/2016 | Lemire | ............... | A61M 5/1415 |
| 2018/0015964 A1 * | 1/2018 | Jacob | ................... | B62D 33/037 |
| 2022/0204097 A1 * | 6/2022 | Allicock | ............... | B62D 33/03 |
| 2024/0010255 A1 * | 1/2024 | Smith | ................... | B62B 5/0033 |
| 2024/0149948 A1 * | 5/2024 | Archer | .................. | B62D 33/04 |
| 2024/0336314 A1 * | 10/2024 | Ishimura | ................ | B62D 61/10 |

FOREIGN PATENT DOCUMENTS

| | | | | | |
|---|---|---|---|---|---|
| DE | 3510541 A1 * | 10/1985 | | | |
| DE | 102009017194 A1 * | 10/2010 | ............. | B62D 21/04 |
| DE | 102016111903 A1 * | 12/2016 | ............. | B60L 50/60 |
| EP | 4159595 A1 * | 4/2023 | ......... | B60H 1/00207 |
| JP | H05-016694 U | | 3/1993 | |
| JP | H05124640 A | * | 5/1993 | |
| JP | H05294343 A | * | 11/1993 | |
| JP | H0678234 U | * | 11/1994 | |
| JP | H06345091 A | * | 12/1994 | |
| JP | H0713735 U | * | 3/1995 | |
| JP | H07156944 A | * | 6/1995 | |
| JP | H10194264 A | * | 7/1998 | |
| JP | 2001055231 A | * | 2/2001 | |
| JP | 2001122256 A | * | 5/2001 | |
| JP | 2001122257 A | * | 5/2001 | |
| JP | 2001278383 A | * | 10/2001 | |
| JP | 2002255165 A | * | 9/2002 | |
| JP | 2002255174 A | * | 9/2002 | |
| JP | 2002-332039 A | | 11/2002 | |
| JP | 2002332040 A | * | 11/2002 | |
| JP | 3426745 B2 | * | 7/2003 | |
| JP | 2004331157 A | * | 11/2004 | |
| JP | 2006205684 A | * | 8/2006 | |
| JP | 2009083875 A | * | 4/2009 | |
| JP | 2009298412 A | * | 12/2009 | |
| JP | 3157717 U | * | 2/2010 | |
| JP | 3161547 U | * | 8/2010 | |
| JP | 2013119418 A | * | 6/2013 | |
| JP | 5384157 B2 | * | 1/2014 | |
| JP | 7079902 B1 | * | 6/2022 | |
| JP | 2022166661 A | * | 11/2022 | |
| KR | 20020055402 A | * | 7/2000 | |
| KR | 20110137136 A | * | 12/2011 | ............. B65D 19/06 |
| KR | 20180109008 A | * | 10/2018 | ........... B65D 19/385 |
| KR | 20220030069 A | * | 3/2022 | ............. D21H 13/08 |

* cited by examiner

VEHICLE

CROSS-REFERENCE TO RELATED APPLICATION

This application claims priority to Japanese Patent Application No. 2024-150491 filed on Sep. 2, 2024. The disclosure of the above-identified application, including the specification, drawings, and claims, is incorporated by reference herein in its entirety.

BACKGROUND

1. Technical Field

The present disclosure relates to a vehicle.

2. Description of Related Art

"OX Proposes To Offer Clean Mobility To Everyone, Everywhere", [online], Mar. 15, 2021, OX Delivers, [Search on Jul. 19, 2024], Internet <URL: https://insideevs.com/features/494284/ox-clean-mobility-everywhere-everyone/> discloses a vehicle whose automotive components are packaged and transported and can be assembled at a transportation destination.

SUMMARY

The inventors have found the following problem.

In the vehicle disclosed in "OX Proposes To Offer Clean Mobility To Everyone, Everywhere", [online], Mar. 15, 2021, OX Delivers, [Search on Jul. 19, 2024], Internet <URL: https://insideevs.com/features/494284/ox-clean-mobility-everywhere-everyone/>, separate automotive components are packaged and transported. Therefore, it is troublesome to assemble the automotive components at the transportation destination.

The present disclosure has been made in view of such circumstances, and provides a vehicle that is easy to assemble at a transportation destination.

The vehicle according to the present disclosure includes a vehicle body in which a power portion where at least a power source of the vehicle body is mounted and a front-rear portion where at least one of a front wheel and a rear wheel is attached are connected via a link mechanism.

The link mechanism includes a fastening portion between the power portion and the front-rear portion, and a guide hole that guides the fastening portion to a predetermined position by sliding.

A traveling form in which traveling is performable while maintaining a state in which the power portion and the front-rear portion are flat and a transportation form in which transportation is performable while maintaining a state in which the front-rear portion is folded toward the power portion with a fold line between the front-rear portion and the power portion are reversibly changed by sliding the fastening portion along the guide hole.

In the vehicle according to the present disclosure, the transportation form and the traveling form are reversibly changed by sliding the fastening portion along the guide hole. With such a configuration, assembling at the transportation destination is facilitated.

In the vehicle, at least one of the power portion and the front-rear portion may have a honeycomb structure.

With such a configuration, it is possible to improve the strength of at least one of the power portion and the front-rear portion. Therefore, it is possible to suppress deformation of the front-rear portion and the power portion due to an impact during transportation and traveling.

The vehicle may further include two boarding portions each including at least a door for a driver to get on and off.

A total number of the front-rear portions and the power portions may be four, including at least one front-rear portion and at least one power portion.

In the traveling form, the front-rear portion and the power portion may be provided to linearly extend to adjoin each other, and the boarding portions may be each connected to the front-rear portion or the power portion via the link mechanism in a direction perpendicular to a direction in which the front-rear portion and the power portion are provided to extend.

In the transportation form, a hexahedron in which the boarding portions are disposed to face each other and positioned at sides may be defined by folding the boarding portions toward the power portion with fold lines between the boarding portions and the front-rear portion or the power portion.

With such a configuration, the vehicles can be stacked when being loaded in a transportation container. Therefore, the transportation efficiency is high and the transportation cost can be reduced.

The vehicle may further include first reinforcing members and second reinforcing members that are removable depending on a form of the vehicle.

In the transportation form, the first reinforcing members may sandwich the front-rear portion and the power portion to maintain the state in which the front-rear portion is folded toward the power portion.

In the traveling form, the second reinforcing members may sandwich the front-rear portion and the power portion to maintain the state in which the power portion and the front-rear portion are flat.

With such a configuration, it is possible to suppress deformation of the front-rear portion and the power portion due to an impact during transportation and traveling.

A vehicle includes a power portion where at least a power source of a vehicle body is mounted, and a front-rear portion where at least one of a front wheel and a rear wheel is attached. The power portion and the front-rear portion are connected via a link mechanism.

The link mechanism is rotatable by engaging, in cross section, a U-shaped cross section of the front-rear portion with a U-shaped cross section of the power portion.

A transportation form in which transportation is performable while maintaining a state in which the front-rear portion is folded toward the power portion with a fold line between the front-rear portion and the power portion and a traveling form in which traveling is performable while maintaining a state in which the power portion and the front-rear portion are flat are reversibly changed by rotating the front-rear portion about the link mechanism.

In the vehicle according to the present disclosure, the transportation form and the traveling form are reversibly changed by rotating the front-rear portion about the link mechanism. Thus, assembling at the transportation destination is facilitated.

According to the present disclosure, it is possible to provide the vehicle that is easy to assemble at the transportation destination.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
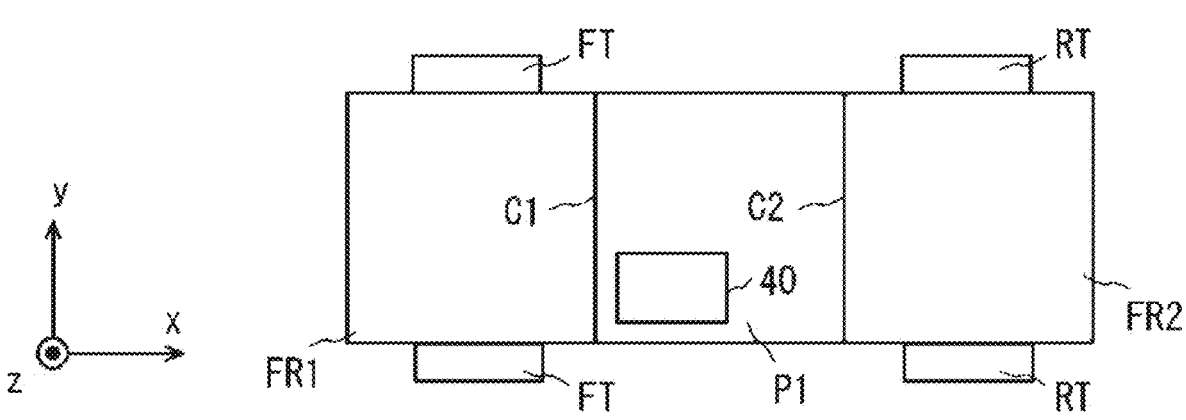
FIG. 1 is an explanatory diagram for explaining a change in form of a vehicle according to a first embodiment.
Figure 1:
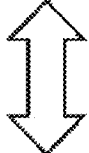
Figure 1:
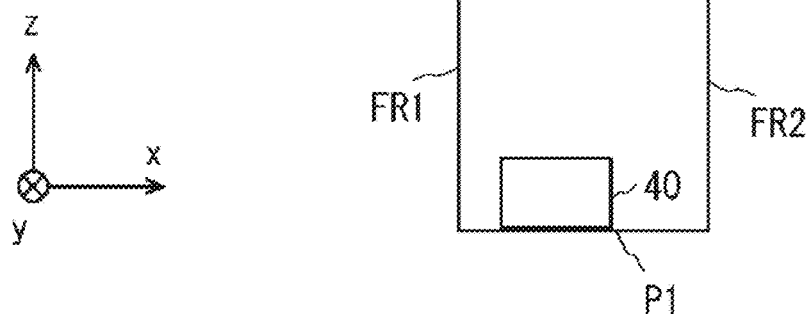

Hereinafter, the present disclosure will be described through embodiments of the disclosure, but the disclosure according to the claims is not limited to the following embodiments. Also, not all of the configurations described in the embodiments are indispensable as means for solving the problem. For clarity of explanation, the following description and the drawings are omitted and simplified as appropriate. In the drawings, the same elements are denoted by the same reference numerals, and redundant descriptions are omitted as necessary.

It should be understood that the right-hand system xyz Cartesian coordinates illustrated in the drawings are for convenience of describing the positional relation of the constituent elements. Typically, the positive z-axis direction is the upward vertical direction, and the xy plane is a horizontal plane.

First Embodiment

Vehicle

First, a configuration of a vehicle according to a first embodiment will be described with reference to FIG. 1. FIG. 1 is an explanatory diagram for explaining a change in form of a vehicle according to a first embodiment. The upper part of FIG. 1 is an xy plan view illustrating a traveling form of the vehicle. The lower part of FIG. 1 shows the transportation form of the vehicles and is an xz plan view. Vehicle 10 is typically transported in a transportation form, assembled at a destination, transformed into a traveling form, and traveled in a traveling form.

As illustrated in FIG. 1, the vehicle 10 includes a power portion P1 and a front-rear portion FR1, FR2. The power portion P1 is equipped with at least a power source of the vehicle body. In the embodiment shown in FIG. 1, the power portion P1 is equipped with battery 40.

Although not shown in FIG. 1, the power portion P1 may be equipped with a power source of the vehicles 10, for example, a transaxle, a motor, or the like. Further, the power portion P1 may be equipped with a vehicle component (such as a steering wheel described later) required in the traveling form, a tool required when changing the form, and the like. Although not shown in FIG. 1, the seat of the vehicle 10 is disposed above the battery 40.

In the embodiment illustrated in FIG. 1, the vehicle 10 includes one power portion P1 and two front-rear portions FR1, FR2. As shown in FIG. 1, the front-rear portion FR1 and the front-rear portion FR2 are disposed so as to sandwich the power portion P1 toward the front rear of the vehicle.

At least one of the front wheel and the rear wheel is attached to the front-rear portion FR1 and the front-rear portion FR2. In the embodiment shown in FIG. 1, a front wheel FT is attached to the front-rear portion FR1, and a rear wheel RT is attached to the front-rear portion FR2.

Note that the front-rear portion FR1 and the front-rear portion FR2 may be configured such that, in the transportation form, the front wheel FT and the rear wheel RT are attached when the front wheel FT and the rear wheel RT are not attached and are assembled at the transportation destination and changed to the traveling form. Here, the front wheel FT and the rear wheel RT may be transported together with the vehicles 10 or may be procured locally.

A handle or an accelerator pedal may be attached to the front-rear portion FR1 and the front-rear portion FR2, or a handle or an accelerator pedal may be attached when the vehicle is assembled at a transportation destination and changes to a traveling form. The front-rear portion FR1 and the front-rear portion FR2 are part of the pallet in the transportation form, and are ladder frames in the traveling form.

The power portion P1, the front-rear portion FR1, and the front-rear portion FR2 are connected to each other via a link mechanism. In the embodiment shown in FIG. 1, C1 between the power portion P1 and the front-rear portion FR1 is connected by a link mechanism. C2 between the power portion P2 and the front-rear portion FR2 is connected by a link mechanism. Details of the traveling form, the transportation form, and the link mechanism of the vehicle 10 will be described below.

Traveling Form

As illustrated in the upper part of FIG. 1, the vehicle 10 is in a traveling form in which the power portion P1 and the front-rear portion FR1, FR2 can travel while being maintained flat. For example, the driver rides on a seat (not shown in FIG. 1) of the power portion P1 and operates a steering wheel or an accelerator pedal attached to the front-rear portion FR1 to drive the vehicle 10. Here, the front-rear portion FR2 may be utilized as a loading platform.

Transportation Form

As shown in the lower part of FIG. 1, the vehicle 10 is in a transportation form that can be transported while the front-rear portion FR1, FR2 is bent toward the power portion P1 with C1, C2 between the power portion P1 and the front-rear portion FR1, FR2 as a fold line.

More specifically, as shown in the lower part of FIG. 1, the front-rear portion FR1 is bent toward the power portion P1 using C1 between the power portion P1 and the front-rear portion FR1 as a fold line. In addition, the front-rear portion FR2 is bent toward the power portion P1 with C2 between the power portion P1 and the front-rear portion FR2 as a fold line. In other words, in the transportation form, the front-rear portion FR1, FR2 is arranged to oppose each other and has a U-shape as shown in the lower part of FIG. 1.

In general, a vehicle is loaded into a transportation container in a traveling form, so that one vehicle is loaded into one transportation container. However, in the vehicle 10 according to the first embodiment, the transport container is loaded in the transportation form shown in the lower part of FIG. 1. Therefore, a plurality of vehicles 10 are loaded into the transportation container, so that the transportation efficiency is high and the transportation cost can be reduced.

Further, in the transportation form shown in the lower part of FIG. 1, the battery 40 mounted on the power portion P1 can suppress an impact during transportation by the front-rear portion FR1 and the front-rear portion FR2. In the transportation form, the dimensions of the width, the depth, and the height can be arbitrarily set according to the dimensions of the container.

Link Mechanism

Figure 2:
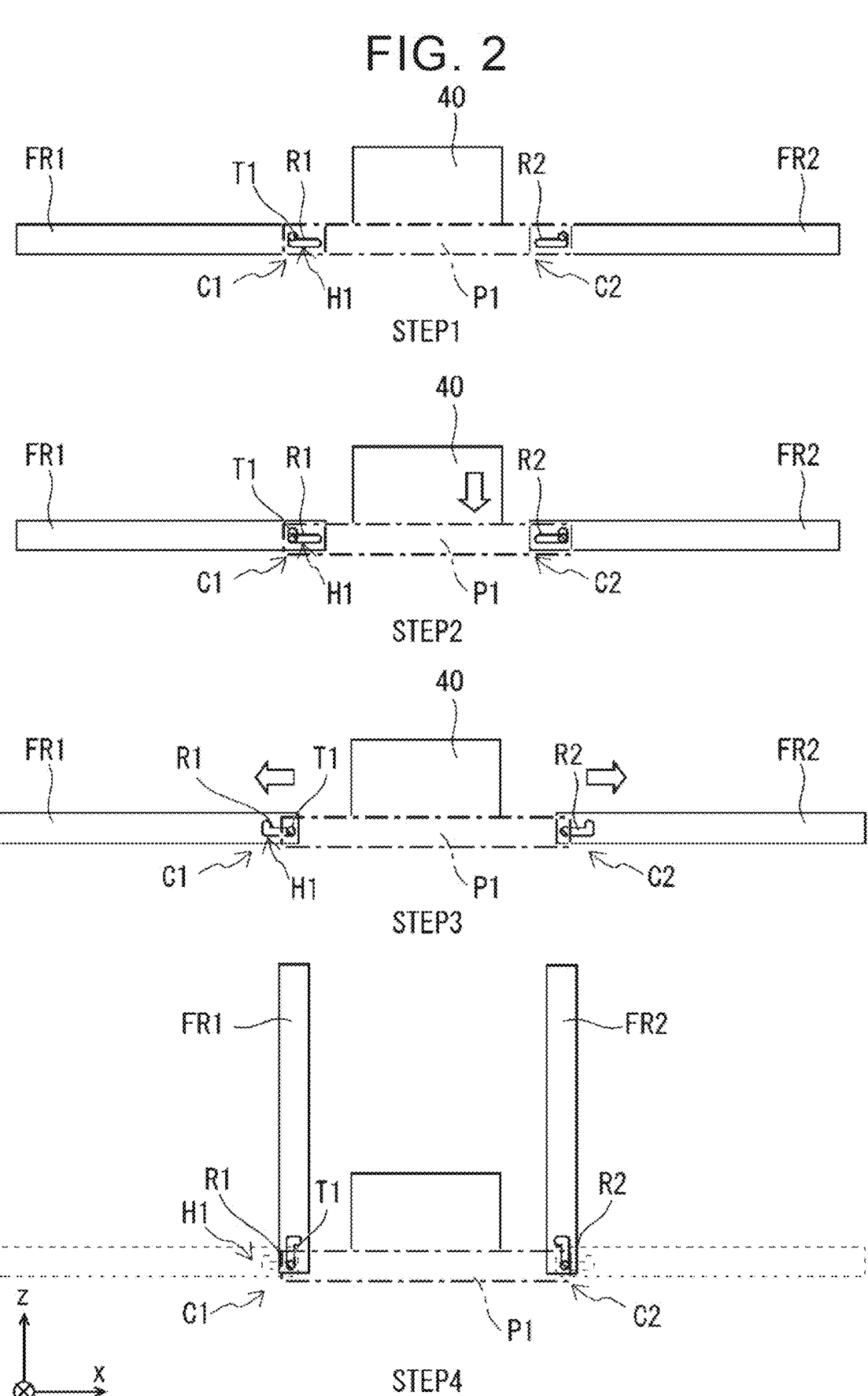
FIG. 2 is a diagram illustrating a change in form of a vehicle according to the first embodiment.
Figure 3:
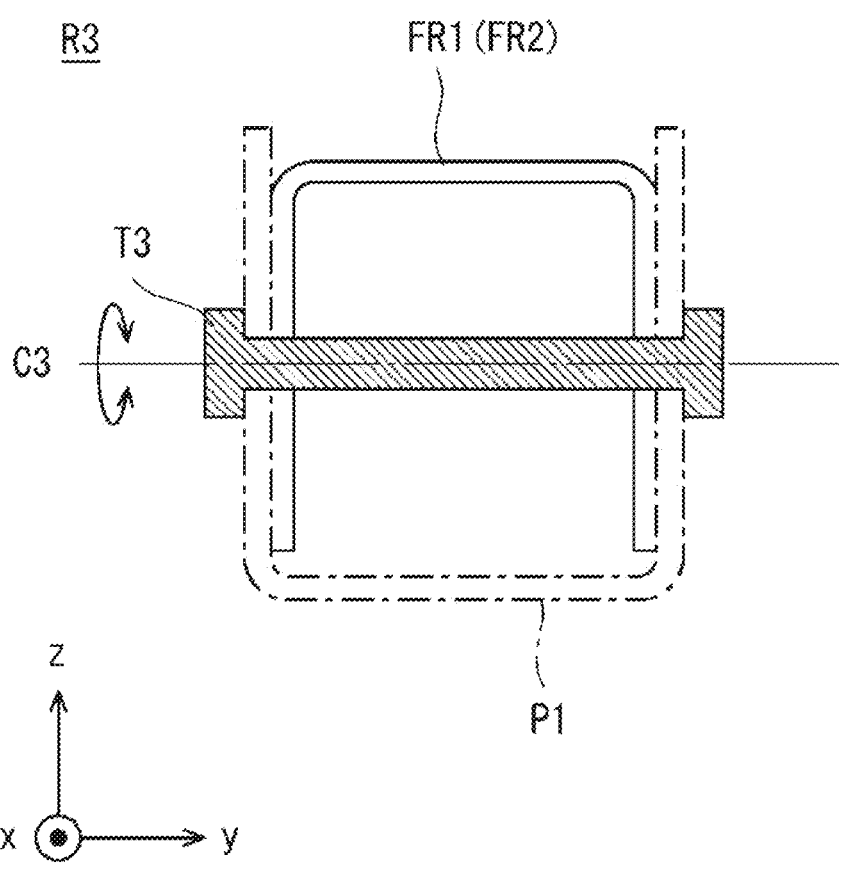
FIG. 3 is a diagram illustrating an example of a link mechanism.

Referring to FIGS. 2 and 3, a link mechanism between the power portion P1 and the front-rear portion FR1, FR2 will be described. FIG. 2 is a diagram illustrating a change in form of the vehicle according to the first embodiment. FIG. 3 is a diagram illustrating an example of a link mechanism.

An example of a link mechanism will be described with reference to FIG. 2. As shown in FIG. 2, a link mechanism R1, R2 is disposed in a C1, C2 between the power portion P1 and the front-rear portion FR1, FR2. The link mechanism R1 will be described below because the link mechanism R1 and the link mechanism R2 have the same configuration.

As shown in FIG. 2, the link mechanism R1 has a fastening portion T1 and a guide hole H1. The fastening portion T1 fastens the power portion P1 and the front-rear portion FR1. The fastening portion T1 is typically configured by bolts and nuts, and is configured to be loosened.

The guide hole H1 has an L-shape. The fastening portion T1 is slidable by loosening the bolts and nuts from one end of the L-shape of the guide hole H1 to the other end. In other words, the guide hole H1 can be said to be a hole that guides the fastening portion to a predetermined position by sliding it.

The link mechanism is not limited to the example illustrated in FIG. 2, and may be the link mechanism illustrated in FIG. 3. FIG. 3 is a cross-sectional view of a link mechanism, which replaces the link mechanism shown in FIG. 2.

As shown in FIG. 3, in the cross section of the link mechanism R3, the U-shaped cross section of the front-rear portion FR1 (FR2) is engaged with the U-shaped cross section of the power portion P1. The fastening portion T3 fastens the power portion P1 and the front-rear portion FR1 (FR2). The fastening portion T3 is typically constituted by a bolt and a nut, and the front-rear portion FR1 (FR2) is configured to be rotatable about a link mechanism R3 (central axial C3). In the U-shaped cross section of the power portion P1, the center portion is linearly provided so as to be parallel to the y-axis direction, and the side portion is provided so as to be parallel to the z-axis direction. In the U-shaped cross section of the power portion P1, both ends of the center portion are curved with respect to the center portion, and side portions are provided. The same applies to the U-shaped cross section of the front-rear portion FR1 (FR2).

Morphological Change

Next, with reference to FIG. 2, a configuration change from the traveling form of the vehicle 10 to the transportation form will be described. In FIG. 2, ST1 shows the traveling form and ST4 shows the transportation form.

As illustrated in ST1 of FIG. 2, when the vehicles 10 are in the traveling form, the power portion P1 and the front-rear portion FR1, FR2 remain flat. In the link mechanism R1, the fastening portion T1 is fastened and fixed at one end portion of the L-shaped guide hole H1.

First, in the link mechanism R1, the fastening of the fastening portion T1 is loosened. Then, as shown in ST2 of FIG. 2, the fastening portion T1 slides and moves from one end portion of the L-shape of the guide hole H1 toward the end portion in the lateral direction (the center portion of the L-shape). As a result, as shown in ST2 of FIG. 2, the power portion P1 is moved in the z-axis negative direction.

Next, as shown in ST3 of FIG. 2, the fastening portion T1 slides and moves from the L-shaped short-side end portion (L-shaped center portion) of the guide hole H1 toward the other end portion. That is, with respect to the power portion P1, the front-rear portion FR1 slides in the x-axis negative direction, and moves with respect to the power portion P1 by sliding the front-rear portion FR2 in the x-axis positive direction. As a result, as shown in ST3 of FIG. 2, the front-rear portion FR1 can be bent toward the power portion P1.

Next, as shown in ST4 of FIG. 2, the front-rear portion is bent toward the power portion with the gap between the front-rear portion and the power portion as a fold line. More specifically, the front-rear portion FR1 is bent toward the power portion P1 using C1 between the front-rear portion FR1 and the power portion P1 as a crease. Further, the front-rear portion FR2 is bent toward the power portion P1 using C2 between the front-rear portion FR2 and the power portion P1 as a crease. As a result, the front-rear portion FR1, FR2 of the vehicles 10 are arranged so as to oppose each other.

In order to maintain this condition, in the link mechanism R1, the fastening portion T1 is fastened and fixed at the other end portion of the L-shape of the guide hole H1. In this manner, the vehicles 10 change from a traveling form (ST1) to a transportation form (ST4).

In FIG. 2, the vehicles 10 change from the traveling form (ST1) to the transportation form (ST4) by changing from ST1 to ST4. The vehicle 10 may change from a transportation form to a traveling form. The vehicles 10 change from the transportation form to the traveling form, for example, by changing in the order of ST4 3, 2, and 1 illustrated in FIG. 2.

As described above, by sliding the fastening portion T1 along the guide hole H1, the vehicles 10 reversibly change the transportation form and the traveling form. With such a configuration, assembly at the transport destination is facilitated. Further, even in the link mechanism R3 shown in FIG. 3, the vehicle 10 reversibly changes the transportation form and the traveling form only by rotating the front-rear portion FR1 (FR2) around the link mechanism R3 (the central shaft C3), so that the assembly at the transportation destination is easy.

Reinforcing Member

Figure 4:
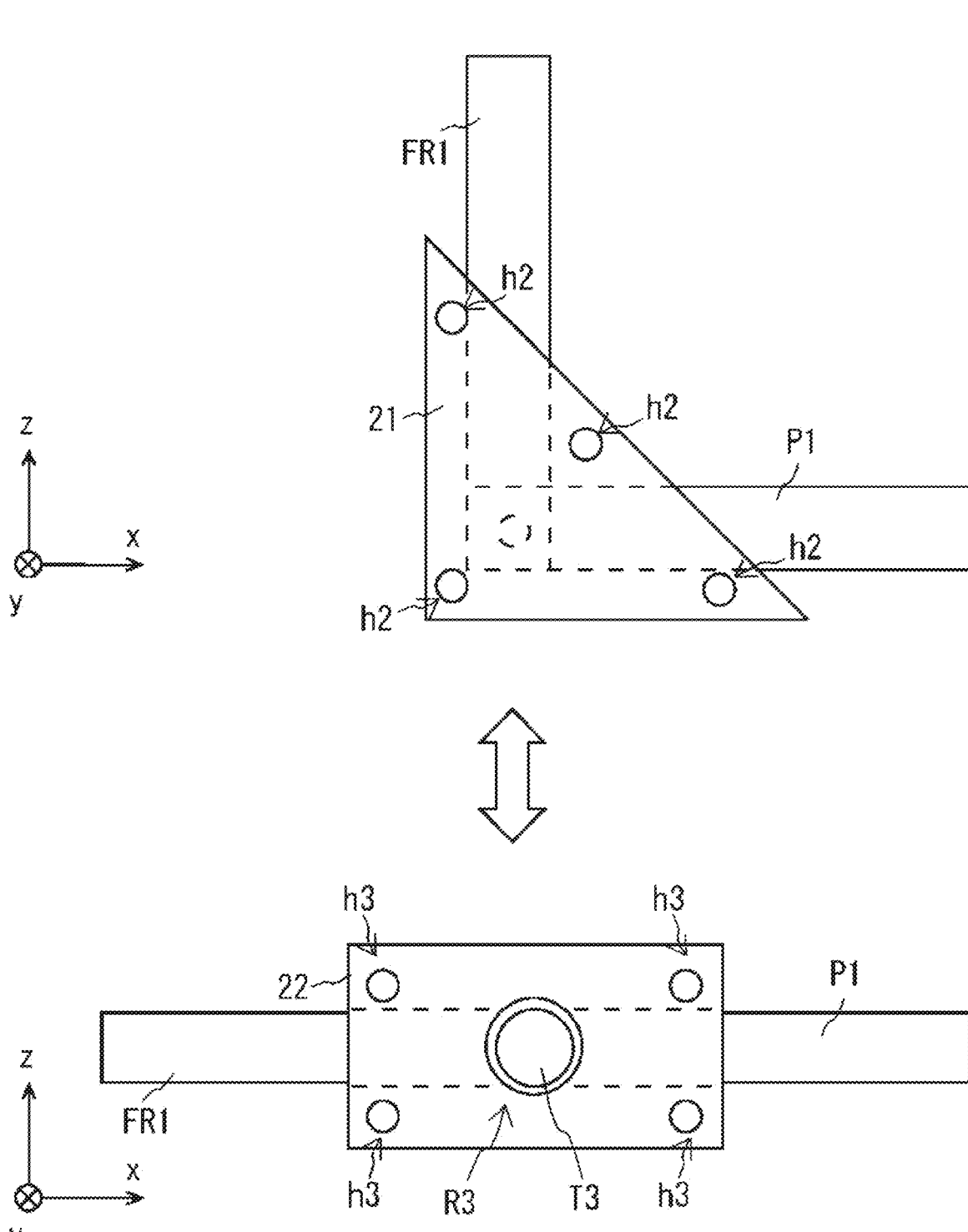
FIG. 4 is a view showing a reinforcing member in a traveling form and a transportation form.

The reinforcing member will be described with reference to FIG. 4. FIG. 4 is a view illustrating the reinforcing member in the traveling form and the transportation form. The upper part of FIG. 4 is an xy plan view illustrating a traveling form of the vehicles. The lower part of FIG. 4 is a plan view of xz, showing the transportation form of the vehicles. In FIG. 4, the link mechanism is described as being the link mechanism R3 shown in FIG. 3. In FIG. 4, the front-rear portion FR1 and the power portion P1 are illustrated for the sake of simplicity. The front-rear portion FR2 is omitted.

As shown in the upper part of FIG. 4, the auxiliary member 21 has a triangular shape. The auxiliary member 21 is provided such that one side is parallel to the longitudinal direction of the power portion P1 and one side is parallel to the longitudinal direction of the front-rear portion FR1. Two auxiliary members 21 are provided to sandwich the front-rear portion FR1 and the power portion P1.

It is possible to maintain the state in which the front-rear portion FR1 is bent toward the power portion P1 by inserting a bolt into the hole h2 and tightening the nut while the auxiliary member 21 sandwiches the front-rear portion FR1 and the power portion P1. Accordingly, it is possible to prevent the front-rear portion FR1 and the power portion P1 from being deformed due to an impact during transportation.

In addition, an impact at the time of transportation to the battery 40 (see FIG. 1) can be reduced.

As shown in the lower part of FIG. 4, the auxiliary member 22 has a rectangular shape. The auxiliary member 22 is provided such that the long side thereof is parallel to the longitudinal direction of the power portion P1 and the front-rear portion FR1. Two auxiliary members 22 are provided to sandwich the front-rear portion FR1 and the power portion P1.

It is possible to maintain the flat state of the power portion P1 and the front-rear portion FR1 by inserting a bolt into the hole h3 and tightening the nut while the auxiliary member 22 sandwiches the front-rear portion FR1 and the power portion P1. Accordingly, it is possible to suppress deformation of the front-rear portion FR1 and the power portion P1 due to an impact during traveling. In addition, it is possible to reduce stresses applied to the fastening portion T3 during traveling.

In FIG. 4, the reinforcing member is attached as the link mechanism is the link mechanism R3 shown in FIG. 3. However, the present disclosure is not limited thereto, and the reinforcing member may be attached to the link mechanism R1 illustrated in FIG. 2. Note that the auxiliary member 21 is referred to as a first reinforcing member, and the auxiliary member 22 is referred to as a second reinforcing member.

Honeycomb Structure

Figure 5:
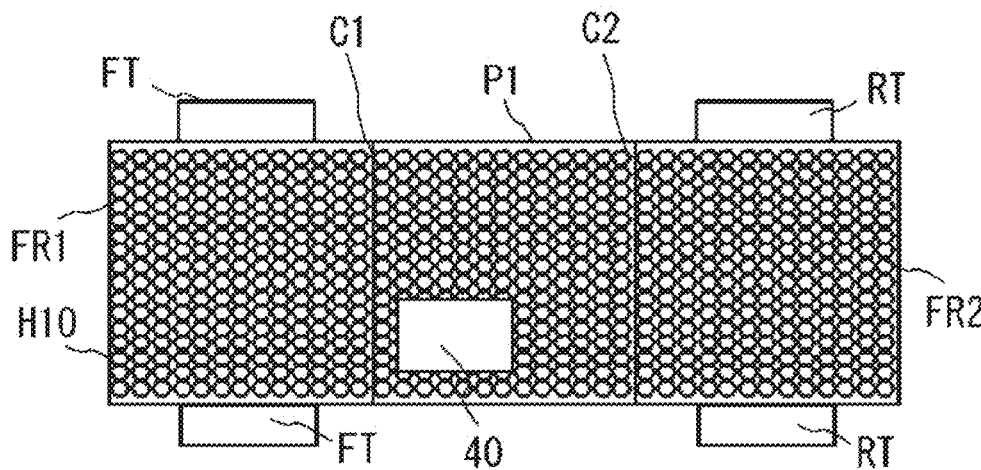
FIG. 5 is an xy plan view showing a traveling form of the vehicle according to the first embodiment.

A honeycomb structure of the power portion and the front-rear portion will be described with reference to FIG. 5. FIG. 5 is an xy plan view illustrating a traveling form of the vehicle according to the first embodiment. In FIG. 5, the configuration is the same as that shown in FIG. 1 except that the power portion P1 and the front-rear portion FR1, FR2 have a honeycomb configuration, and therefore, explanation thereof will be omitted.

As illustrated in FIG. 5, in the vehicles 10, the power portion P1 and the front-rear portion FR1, FR2 have a honeycomb structure H10. However, the present disclosure is not limited thereto, and the vehicle 10 may have a configuration in which at least one of the power portion P1 and the front-rear portion FR1, FR2 has a honeycomb structure H10.

In the vehicles 10, at least one of the power portion P1 and the front-rear portion FR1, FR2 has a honeycomb structure H10, so that weight reduction and strength improvement can be achieved. Therefore, deformation of the front-rear portion FR1 and the power portion P1 due to an impact during transportation and traveling can be suppressed. In addition, an impact on the battery 40 (see FIG. 1) during transportation and traveling can also be mitigated.

Further, in the vehicle 10, since at least one of the power portion P1 and the front-rear portion FR1, FR2 has the honeycomb structure H10, the hole of the honeycomb serves as an air-passage, and it is possible to suppress the accumulation of moisture in the vicinity of the battery 40 during transportation. Thus, rust of the battery 40 can be suppressed. In addition, the battery 40 that increases in temperature during traveling can be air-cooled.

The power portion P1 and the front-rear portion FR1, FR2 are not limited to a honeycomb configuration, and may be configured to arrange braces, grids, and plates.

As described above, in the vehicle 10 according to the first embodiment, the link mechanism R1 includes the fastening portion T1 and the guide hole H1. By sliding the fastening portion T1 along the guide hole H1, the vehicle 10 reversibly changes the transportation form and the traveling form. With such a configuration, assembly at the transport destination is facilitated.

Second Embodiment

Figure 6:
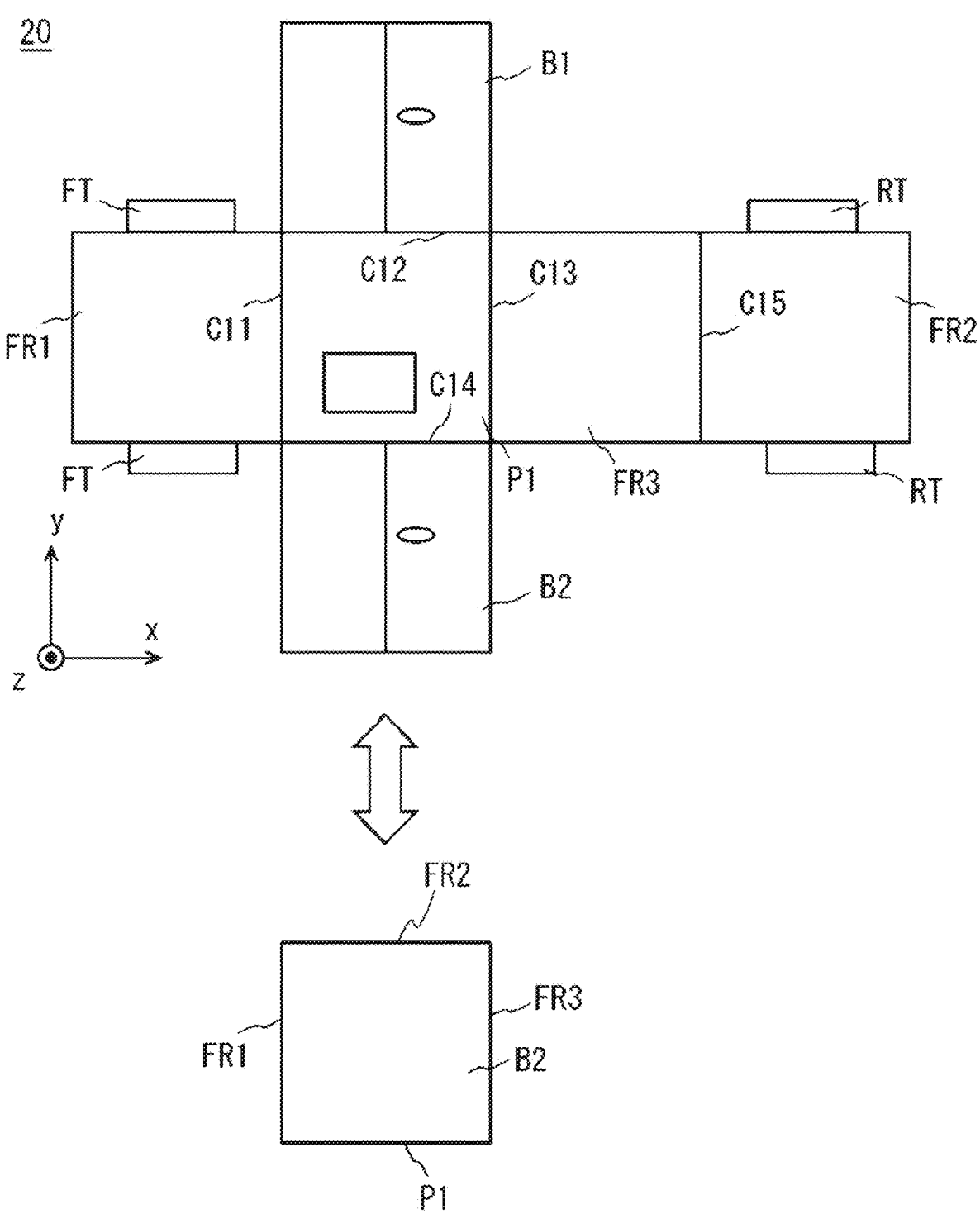
FIG. 6 is an explanatory diagram for explaining a change in form of the vehicle according to the second embodiment.

Next, the configuration of the vehicle according to the second embodiment will be described with reference to FIG. 6. FIG. 6 is an explanatory diagram for explaining a change in form of the vehicle according to the second embodiment. The upper part of FIG. 1 is an xy plan view illustrating a traveling form of the vehicle. The lower part of FIG. 1 shows the transportation form of the vehicles and is an xz plan view. Vehicle 20 is typically transported in a transportation form and assembled at the destination to change to a traveling form.

The vehicle 20 illustrated in FIG. 6 differs from the vehicle 10 illustrated in FIG. 1 in that it includes a front-rear portion FR3 and a boarding portion B1, B2. The configuration of the front-rear portion FR3 in the vehicles 20 is the same as that of the front-rear portion FR1 and 2, and therefore will not be described.

As illustrated in FIG. 6, the vehicle 20 includes two boarding portion B1, B2, one power portion P1, and three front-rear portion FR1, FR2, FR3. The boarding portion B1, B2 shown in FIG. 6 includes at least doors for the driver to get on and off.

Similarly to the vehicle 10, the vehicle 20 reversibly changes the transportation form and the traveling form. A method of changing the form of the vehicle 20 is the same as that of the vehicle 10 illustrated in FIG. 2, and thus description thereof will be omitted. Hereinafter, a transportation form and a traveling form of the vehicle 20 will be described.

Traveling Form

As illustrated in the upper part of FIG. 6, the vehicle 20 extends linearly in the order of the front-rear portion FR1, the power portion P1, the front-rear portion FR3, and the front-rear portion FR2 in the x-axis positive direction. The front-rear portion FR1, the power portion P1, the front-rear portion FR3, and the front-rear portion FR2 extend adjacently to each other. The boarding portion B1, B2 is connected to the power portion P1 via a link mechanism (not shown in FIG. 6) in a direction perpendicular to the extending direction.

As illustrated in the upper part of FIG. 6, the vehicle 10 has a traveling form in which the front-rear portion FR1, the power portion P1, the front-rear portion FR3, and the front-rear portion FR2 can travel while being maintained flat. In the upper part of FIG. 6, for ease of explanation, the vehicle 20 is assembled such that the boarding portion B1, B2 is parallel to xy plane, but in the traveling form, the boarding portion B1, B2 is parallel to xz plane. Then, the boarding portion B1, B2 are connected to each other by, for example, a pipe (not shown in FIG. 6) to form a roof of the vehicle. In addition, the boarding portion B1, B2 may be connected to each other by, for example, a pipe (not shown in FIG. 6), and may be formed as a roof of a vehicle covered with a cloth.

The driver rides on a seat (not shown in FIG. 1) of the power portion P1 and operates a steering wheel or an accelerator pedal attached to the front-rear portion FR1 to drive the vehicle 20. Here, the front-rear portion FR2, FR3 may be utilized as a loading platform. As described above, since the vehicle 20 includes six surfaces, it is possible to increase the space of the loading platform.

Transportation Form

As shown in the lower part of FIG. 6, the front-rear portion FR1 is bent toward the power portion P1 with C11 between the power portion P1 and the front-rear portion FR1 as a fold line. In addition, the front-rear portion FR2 is bent toward the power portion P1 at C13 between the power portion P1 and the front-rear portion FR3 as a fold line. Further, the front-rear portion FR2 is maintained bent toward the front-rear portion FR3 with C15 between the front-rear portion FR3 and the front-rear portion FR3 as a fold line.

Then, the boarding portion B1 is maintained bent toward the power portion P1 by using C12 between the boarding portion B1 and the power portion P1 as a crease. The boarding portion B2 is kept bent toward the power portion P1 by using C14 between the boarding portion B2 and the power portion P1 as a crease.

That is, as shown in the lower part of FIG. 6, in the transportation form, the front-rear portion FR1, FR3 is oppositely arranged, and the boarding portion B1 (not shown in the lower part of FIG. 6) and the boarding portion B2 are oppositely arranged in the vehicle 20. In addition, the vehicle 20 in the transportation form has a six-sided structure as shown in the lower part of FIG. 6 in which the power portion P1 and the front-rear portion FR2 are arranged in the opposite arrangement. In other words, in the transportation form, the vehicles 20 are six-sided, with the power portion P1 serving as a bottom surface, the front-rear portion FR2 serving as a top surface, the boarding portion B1, B2, and the front-rear portion FR1, FR3 serving as a side surface.

With such a configuration, the vehicle 20 can stack other vehicles 20 above the vehicle 20 when being loaded into a transportation container. Therefore, the transportation efficiency is high, and the transportation cost can be reduced. Further, in the transportation form shown in the lower part of FIG. 6, the battery 40 mounted on the power portion P1 are located inside the six-sided body, and thus impact during transportation can be suppressed.

In the vehicle 20 illustrated in FIG. 6, an embodiment in which one power portion P1 and three front-rear portion FR1, FR2, FR3 are provided has been described. However, the configuration is not limited to this, and may include two front-rear portions and two power portions. That is, the vehicle 20 may have a total of four portions including at least one front-rear portion and at least one power portion.

Further, in the vehicle 20 illustrated in FIG. 6, the boarding portion B1 is connected to the power portion P1 via a link mechanism (not illustrated in FIG. 6) in a direction perpendicular to the extending direction. However, the present disclosure is not limited thereto, and the boarding portion may be connected to the front-rear portion or the power portion via the link mechanism in a direction perpendicular to the extending direction, and the boarding portions may be oppositely arranged in the transportation form.

As described above, in the vehicle 20 according to the second embodiment, the front-rear portion and the power portion are adjacent to each other and connected to each other by a link mechanism so as to extend linearly. The boarding portion is connected to the power portion via a link mechanism in a direction perpendicular to the extending direction. By making such a configuration, the vehicle 20 becomes a six-sided surface in the transportation form and can be stacked when it is loaded into a transportation container. Therefore, the transportation efficiency is high, and the transportation cost can be reduced.

The materials of the vehicles 10 and 20 described above are made of, for example, a metal material or a resin. The vehicles 10 and 20 described above are not restricted in the molding method, and are molded by, for example, injection molding.

The present disclosure is not limited to the above-described embodiment, and can be appropriately modified without departing from the scope of the present disclosure.

What is claimed is:

1. A vehicle comprising:
a vehicle body in which a power portion, where at least a power source of the vehicle body is mounted, and a front-rear portion, where at least one of a front wheel and a rear wheel is attached, are connected via a link mechanism; and
first reinforcing members and second reinforcing members that are removable depending on a form of the vehicle, wherein
the link mechanism includes a fastening portion between the power portion and the front-rear portion, and a guide hole that guides the fastening portion to a predetermined position by sliding,
a traveling form, in which traveling is performable while maintaining a state in which the power portion and the front-rear portion are flat, and a transportation form, in which transportation is performable while maintaining a state in which the front-rear portion is folded toward the power portion with a fold line between the front-rear portion and the power portion, are reversibly changed by sliding the fastening portion along the guide hole,
in the transportation form, the first reinforcing members sandwich the front-rear portion and the power portion to maintain the state in which the front-rear portion is folded toward the power portion, and
in the traveling form, the second reinforcing members sandwich the front-rear portion and the power portion to maintain the state in which the power portion and the front-rear portion are flat.

2. The vehicle according to claim 1, wherein at least one of the power portion and the front-rear portion has a honeycomb structure.

* * * * *